(12) United States Patent
Barkai

(10) Patent No.: US 8,919,124 B2
(45) Date of Patent: Dec. 30, 2014

(54) HYDROGEN PERMEABLE PIPE

(75) Inventor: Menashe Barkai, Tel Aviv (IL)

(73) Assignee: Siemens Concentrated Solar Power Ltd, Beit Shemesh (IL)

( * ) Notice: Subject to any disclaimer, the term of this patent is extended or adjusted under 35 U.S.C. 154(b) by 766 days.

(21) Appl. No.: 13/142,467

(22) PCT Filed: Dec. 29, 2009

(86) PCT No.: PCT/IL2009/001225
§ 371 (c)(1),
(2), (4) Date: Sep. 14, 2011

(87) PCT Pub. No.: WO2010/076790
PCT Pub. Date: Jul. 8, 2010

(65) Prior Publication Data
US 2012/0042651 A1    Feb. 23, 2012

Related U.S. Application Data

(60) Provisional application No. 61/193,824, filed on Dec. 29, 2008.

(51) Int. Cl.
| | | |
|---|---|---|
| B60K 16/00 | (2006.01) |
| B60L 8/00 | (2006.01) |
| F03G 6/00 | (2006.01) |
| F24D 19/08 | (2006.01) |
| F03G 6/06 | (2006.01) |
| F02C 1/05 | (2006.01) |

(52) U.S. Cl.
CPC . *F03G 6/067* (2013.01); *F02C 1/05* (2013.01); *F03G 6/064* (2013.01); *Y02E 10/46* (2013.01)
USPC .......................................... 60/641.8; 137/197

(58) Field of Classification Search
USPC ............................ 60/641.8–641.15; 137/197; 166/227–236
See application file for complete search history.

(56) References Cited

U.S. PATENT DOCUMENTS 3,503,438 A * 3/1970 Geyer ...................... 165/104.26
3,693,346 A * 9/1972 Fletcher .......................... 91/397
(Continued)

FOREIGN PATENT DOCUMENTS

| CN | 1495394 A | 5/2004 |
| CN | 1720419 A | 1/2006 |

(Continued)

OTHER PUBLICATIONS

Kane et al., "Approche de conception etd'optimisation de centrale solaire integree a cycle combine inspiree de la methode du pincement", Int. J. Therm. Sci., 1999, pp. 501-511, vol. 38, XP 000832038.

(Continued)

*Primary Examiner* — Christopher Jetton

(57) ABSTRACT

A solar thermal power plant is provided. The solar thermal power plant includes a solar collection system configured for utilizing incident solar radiation to heat a heat transfer fluid (HTF) and a power block configured for utilizing the heated HTF to generate power. The solar collection system includes a plurality of pipes for carrying HTF characterized by a first degree of permeability to hydrogen, at least some of the pipes including portions exposed to the atmosphere, and including a membrane made of a material being characterized by a second degree of permeability to hydrogen, the second degree of permeability being higher than the first degree of permeability to hydrogen.

5 Claims, 3 Drawing Sheets

(56) References Cited

U.S. PATENT DOCUMENTS

| | | | | |
|---|---|---|---|---|
| 3,841,738 A | * | 10/1974 | Caplan | ............................ 359/852 |
| 5,661,977 A | * | 9/1997 | Shnell | ............................ 60/641.2 |
| 2007/0157614 A1 | | 7/2007 | Goldman | |

FOREIGN PATENT DOCUMENTS

| | | |
|---|---|---|
| CN | 1862143 A | 11/2006 |
| EP | 0206281 A1 | 10/1988 |
| EP | 0526816 A1 | 2/1993 |
| FR | 2450363 A1 | 9/1980 |
| WO | WO 2009/034577 A2 | 3/2009 |
| WO | WO 2009034577 A2 | 3/2009 |
| WO | WO 2010032238 A2 | 3/2010 |

OTHER PUBLICATIONS

Approche de Conception et d'optimisation de Centrale Solaire Intégrée à Cycle Combiné Inspirée de la Méthod du Pincement (Partie 1: Paliers de Recuperation); Kane, M. et al., "Approche de Conception et d'optimisation de Centrale Solaire Intégrée à Cycle Combiné Inspirée de la Méthod du Pincement (Partie 1: Paliers de Recuperation)", Revue Generale de Thermique, Elsevier Editions Scientifiques et Medicates, Paris, France, vol. 38, No. 6, pp. 501-511; 1999; Jun. 1, 1999.

* cited by examiner

US 8,919,124 B2

HYDROGEN PERMEABLE PIPE

CROSS REFERENCE TO RELATED APPLICATIONS

This application is the U.S. National Stage of International Application No. PCT/IL2009/001225, filed Dec. 29, 2009 and claims the benefit thereof. The International Application claims the benefits of U.S. application No. 61/193,824 U.S. filed Dec. 29, 2008. All of the applications are incorporated by reference herein in their entirety.

FIELD OF THE INVENTION

This invention relates to solar thermal power plants, and in particular to arrangements for removing dissociated hydrogen therefrom.

BACKGROUND OF THE INVENTION

Amid concerns over global warming, and forecasts of both the depletion of non-renewable energy sources and rising power demand, suppliers of energy are: increasingly seeking alternative primary sources of energy. One such source of energy is solar energy, and one way of utilizing solar energy is with a solar thermal power plant.

One type of solar power plant utilizes a "radiation concentrator collector" which concentrates the solar radiation by focusing it onto a smaller area, e.g., using mirrored surfaces or lenses. In this system, a reflector, which is typically parabolic, receives and reflects (focuses) incoming solar radiation onto a radiation absorber, which is formed as a tube. The tube radiation absorber is concentrically surrounded by a treated glass enclosure tube to limit the loss of heat. The collector system further includes means to track the sun.

The tube radiation absorber is made of metal with a coating having a high solar radiation absorption coefficient to maximize the energy transfer imparted by the solar radiation reflecting off the reflector. A heat transfer fluid (HTF), which is typically a liquid such as oil, flows within the tube radiation absorber.

The thermal energy is transported by the HTF to power, e.g., a thermalelectric power plant to drive one or more power-generation systems thereof, in order to generate electricity in a conventional way, e.g., by coupling the axle of each of the turbines to an electric generator. One such example of a thermal-electric power plant is a steam-electric power plant, which uses thermal energy provided thereto to produce steam to drive turbines thereof, which in turn drive a generator, thus generating electricity.

Portions of the tube radiation absorbers are typically surrounded with a glass envelope, with the volume therebetween evacuated in order to limit heat loss due to convection. However, hydrogen may be released within the HTF, either by dissociation therefrom or as a product of a cathodic reaction with the interior of the tube radiation absorber, which escapes via the wall of the tube radiation absorber and enters the evacuated volume. In order to maintain high efficiency of the solar power plant, as much of this hydrogen should be removed.

SUMMARY OF THE INVENTION

According to one aspect of the present invention, there is provided a pipe for carrying heat transfer fluid (HTF) within a solar thermal power plant, the plant comprising a solar collection system configured for utilizing incident solar radiation to heat the HTF, and a power block configured for utilizing the heated HTF to generate power; the pipe, which may be made of stainless steel, is characterized by a first degree of permeability to hydrogen thereacross (i.e., between a surface which faces the: ulterior of the pipe and a surface which faces the exterior of the pipe) and comprising at least one portion configured for being exposed to the atmosphere during use arid comprising a hydrogen-passage being characterized by a second degree of permeability to hydrogen, being higher than the first degree of permeability to hydrogen, thereacross.

The hydrogen-passage may compose a membrane comprising palladium, and it may further comprise up to about 30% silver.

The hydrogen-passage may further comprise a covering mechanically secured to the pipe, which may be made of porous steel, being characterized by a permeability to hydrogen which is at least as high as that of the membrane. As hydrogen and The covering may be securingly connected to an area of the pipe surrounding the membrane.

The portion may be formed as a chamber comprising an enclosed volume open to the interior of the pipe and filled with an inert gas, such as nitrogen. The enclosed volume may be disposed such that substantially all of the inert gas remains therein during operation of the plant.

A section of the pipe adjacent the portion may be surrounded by a solid envelope, for example made of a glass or stainless steel material, spaced therefrom, the volume between the envelope and the pipe being evacuated.

The HTF may be selected from a group comprising thermal oil and water/steam.

The solar collection system may comprise a plurality of concentrators, such as parabolic reflectors, configured for concentrating incident sunlight on the, pipes.

According to another aspect of the present invention, there is provided a solar thermal power plant comprising a solar collection system configured for utilizing incident solar radiation to heat an HTF, and a power block configured for utilizing the heated HTF to generate power; the solar collection system comprising a plurality of pipes as described above.

According to a further aspect of the present invention, there is provided a pipe, which may be made of stainless steel, for carrying; heat transfer fluid (HTF) within a solar thermal power plant, die plant comprising a solar collection system configured for utilizing incident solar radiation to heat the HTF, arid a power block configured for utilizing the heated HTF to generate power; the pipe being surrounded by one or more solid envelopes, which may be made of a glass or a stainless steel material, spaced therefrom, a volume defined between each envelope and its respective pipe being evacuated; the pipe comprising:

at least one chamber associated with arid in fluid communication with at least one of the volumes; at least a portion of a wall defining the chamber and exposed to the atmosphere comprising a membrane having a high permeability to hydrogen; the chamber containing a getter material adapted to absorb hydrogen gas and to release it when the getter material is at or above a discharge temperature;

valve configured to selectively isolate the chamber from the volume when closed, and bring the chamber and the volume into fluid communication with one another when open; and a heating element configured to bring; the getter material to a temperature no less than the discharge temperature.

The pipe may further comprise a control system configured to regulate elements of the plant, and to operate in one of:
- a hydrogen release mode, wherein it ensures that the valve is closed and the heating element is on; and
- a hydrogen storage mode, wherein it ensures that the valve is open and the heating element is off.

The plant may further comprise a temperature sensor in communication with the control system and disposed so as to measure the temperature within the chamber, the control system being further configured to ensure that the valve is closed when the temperature within the chamber is at or above a predetermined temperature. The predetermined temperature may be equal to the discharge temperature, or it may be a fixed amount above the ambient temperature, for example approximately 25° C. above the ambient temperature.

The pipe may further comprise a pressure sensor in communication with the control system and disposed so as to measure the pressure within the chamber, the control system being further configured to ensure that the valve is closed when the pressure within the chamber is at or above a predetermined pressure.

The pipe may be a header pipe configured for carrying HTF between the power block and heat collecting elements of said solar collection system.

The chamber may be associated with more than one volume. For example, at least one of the pipes may be surrounded by two transparent solid envelopes spaced axially from one another and denning separate volumes, the chamber being in fluid communication with both volumes.

The HTF may be selected from a group comprising thermal oil mid water/steam.

The solar collection system may comprise a plurality of concentrators, such as parabolic reflectors, configured for concentrating incident sunlight on the pipes.

According to a still further aspect of the present invention, there is provided a solar thermal power plant comprising a solar collection system configured for utilizing incident solar radiation to heat a heat transfer fluid (HTF), and a power block configured for utilizing the heated HTF to generate power; the solar collection system comprising at least one pipe as described in the above aspect.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
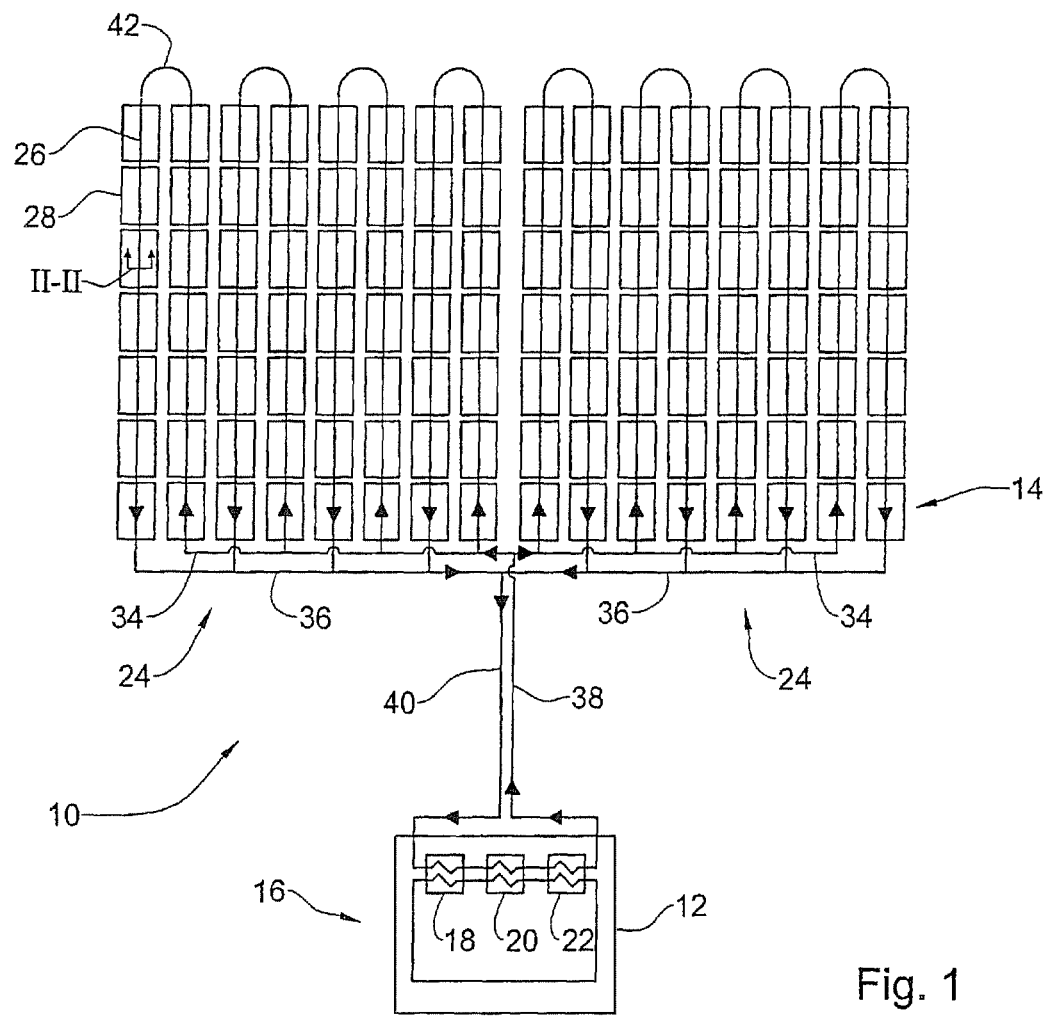
FIG. 1 is a schematic illustrated of a solar thermal power plant.

As illustrated in FIG. 1, there is provided a solar thermal power plant, generally indicated at 10. The plant 10 comprises a power block 12, such as a thermal-electric power plant, which utilizes heat to drive its operation to produce electricity, and a solar, collection system 14 for providing the heat therefor. The solar thermal power plant may be designed m accordance with that described in PCT/IL2009/000899, filed on Sep. 15, 2009, to the present applicant, the disclosure of which is incorporated herein by reference.

The power block 12 comprises elements which are typically found within a power plant and which are well-known, such as one or more turbines, a condenser, feedwater heaters, pumps, etc. (individual elements of the power block are not illustrated). The turbines are coupled to an electrical generator for generating electricity, as is well known in the art. The power block 12 may be designed in accordance with that described in WO2009/034577, filed on Sep. 11, 2008, to the present applicant, the disclosure of which is incorporated herein by reference.

The power block 12 further comprises a steam generation system 16 comprising a steam generation train having three heat exchangers, a pre-heater 18, an evaporator 20, and a super-heater 22. The steam generation train is configured to transfer heat from an outside source (in this case, the solar collection system 14) to working fluid of the power block 12, so that it can reach the elevated temperature and pressure required to optimally drive the turbines thereof The steam generation train may further comprise an optional reheater (not illustrated).

Figure 2:
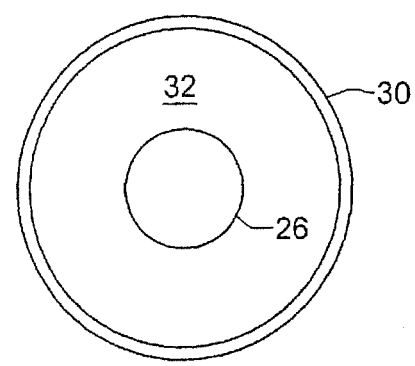
FIG. 2 is a cross-sectional view of a tube radiation absorber of the solar thermal power plant illustrated in FIG. 1, taken along line II-II therein.

The solar collection system 14 comprises one or more solar fields 24, which are configured to capture heat from sunlight impinging thereon and transfer it to the steam generation system 14 of the power block 12 for driving its operation. For this purpose, the solar fields 24 comprise one or more tube radiation absorbers 26, which may be made out of stainless steel, and a plurality of trough collectors 28, such as single-axis parabolic reflectors. As illustrated in FIG. 2, portions of the tube radiation absorbers 26 which are within the collectors 28 are surrounded by a glass envelope 30 spaced therefrom, thus defining a volume 32 between the tube radiation absorber 26 and the glass envelope which is evacuated in order to limit heat loss. Alternatively, any suitable means for concentrating solar radiation, such as Fresnel collectors, may be provided. The tube radiation absorbers 26 carry a heat transfer fluid (HTF) therein, such as a thermal oil (phenyls) which is commercially available, such as under the trade name Therminol® VP-1, Dowtherm™, etc. Alternatively, the HTTP may also be one of steam/water, in which case the plant 10 may operate using direct steam, i.e., the HTF is used as the working fluid for the turbines of the power block 12, and thus the steam generation system 16 may be excluded. The HTF, according to any of the embodiments, is heated within the tube, radiation absorbers 26 upon their exposure to direct solar radiation and solar radiation concentrated by the trough collectors 28. Thus, the HTF is heated as it flows through the tube radiation absorbers 26. Solar collection systems of this type are provided, inter alia by Solel Solar Systems, Ltd. (Israel).

It will be appreciated that while the solar collection system 24 is illustrated in FIG. 1 as comprising two solar fields, any suitable number of fields may be provided without departing from the spirit and scope of the present invention, mutatis mutandis.

Each of the tube radiation absorbers 26 constitutes a loop, which carries HTF through a solar field 24 for heating. Each loop is connected, at an upstream end thereof, to a local return header pipe 34, which is configured to carry thermally depleted HTF from the power block 12 to the solar field 24, and, at a downstream end thereof, to a local supply header pipe 36, which is configured for carrying heated HTF from the solar collection system 14. The solar collection system 14 further comprises a main return header pipe 38, which is configured for carrying thermally depleted HTF from the power block 12 thereto via the local return header pipe 34, and a main supply header pipe 40, which is configured for carrying heated HTF from the solar collection system to die power block for driving its operation. The direction of now of HTF through each of the tube radiation absorbers 26, local return header pipes 34, local supply header pipes 36, main return header pipe 38, and main supply header pipe 40 is indicated by arrows in FIG. 1.

Figure 3A:
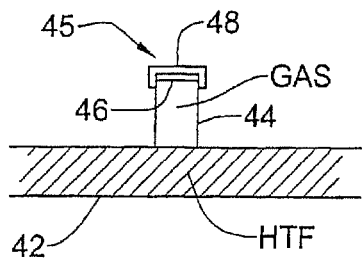
FIGS. 3A arid 3B are longitudinal cross-sectional views of examples of a middle portion of a loop of the solar thermal power plant illustrated hi FIG. 1.

A middle portion 42 of each loop is typically not exposed to concentrated solar radiation from the trough collectors 28. This portion 42 may exposed to the atmosphere, i.e., not being surrounded by an envelope and thus having no evacuated volume therearound. /Is illustrated in FIG. 3A, a radially extending chamber 44 may be provided on the middle portion 42 of the loop, which may be made as an extension of the tube radiation absorber 26. The chamber defines an enclosed volume which is open at one end to tile interior of the tube radiation absorber 26 (the line in FIG. 3 between the middle portion 42 of the loop and the ulterior of the chamber 44 indicates the surface of the HTF, and is not a structural separation between the two). A portion of the chamber 44 consumes a hydrogen passage 45, being made of a material with a high permeability to hydrogen, such as comprising or being constituted by a thin (e.g., on the order of 0.1 mm) membrane 46 of palladium, which may contain silver, for example up to about 20%-30%. As the membrane 46 is typically very thin, it may be subject to rupture or detachment from the rest of the chamber 44. Therefore, the hydrogen passage 45 may further comprise a covering 48 over the membrane 46, on the outer side of the chamber 44, in order to prevent the relatively high pressure of the HTF during operation to eject the membrane 46 from its place. The covering 48 may comprise a high strength, highly permeable material, such as porous stainless steel, for example formed as a disk. The covering 48 may be connected to an area of the chamber surrounding the membrane 46, for example by welding or by pressing thereon with high pressure. The covering 48 maintains the membrane 46 in place, while not interfering with gas transfer thereacross.

Figure 3B:
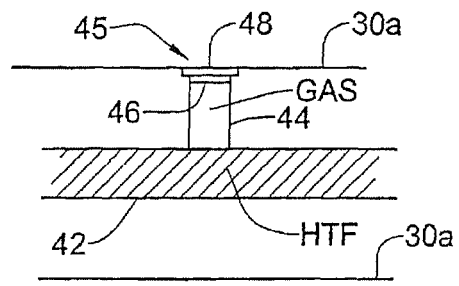

As illustrated in FIG. 3B, the middle portion 42 may be enclosed surrounded by an envelope 30a, which may be glass, stainless steel, or any other suitable material. The volume 32a between the envelope 30b and the middle portion 42 may be evacuated. The volume 32a may be in fluid communication with the volume 32 between the tube radiation absorber 26 and its associated glass envelope 30, or it may be isolated therefrom.

It will be appreciated that while the chamber 44 is described as being located at a middle portion 42 of a loop (i.e., a portion thereof not exposed to concentrated solar radiation from the trough collectors 28), it may be provided at any portion of the loop, for example on a portion of a tube radiation absorber 26 which is exposed to concentrated solar radiation.

It will be appreciated that while reference is made to a middle portion 42 of the loop, the chamber 44 may be provided at any appropriate portion thereof, or on a pipe or tube carrying HTF which does riot constitute a portion of one of the loops, for example on one of the header pipes 34, 36, 38, 40.

The interior of the chamber 44 is filled with an inert gas, such as nitrogen (N2). The chamber is maintained above the HTF, in order to keep the inert gas therein, and thus prevent HTF from collecting therein.

During operation, the HTF is heated. In a case where the HTF is provided as a thermal oil, hydrogen is released by dissociation therefrom. In a case where the HTF is provided as water/steam, i.e., when the plant 10 operates using direct steam as described above, corrosion of the tube radiation absorber may be associated with a cathodic reaction in which hydrogen is released. In either case, as hydrogen is a relatively small molecule, the material of the tube radiation absorber 26 exhibits a degree of permeability thereto; thus, some of it escapes the tube radiation absorber and enters the evacuated volume 32 between it arid the glass envelope 30. The presence of this hydrogen hi the volume 32 allows for conductive heat flow between the, tube radiation absorber 26 and the atmosphere, thus resulting in heat losses, as is well known in the art, getters (not illustrated) maybe provided within the evacuated volume 32 to sequester this hydrogen, and thus limit the heat loss.

In addition, a portion of the released hydrogen enters the chambers 44, wherein it rises through the inert gas therein and exits via the membrane 46. As the permeability of the membrane to hydrogen is relatively high, and in any event higher than that of the material of the tube radiation absorber 26, a significant amount of hydrogen is released to the atmosphere thereby. Thus, the number of getters necessary within the enclosed volume 32 may be reduced.

Figure 4:
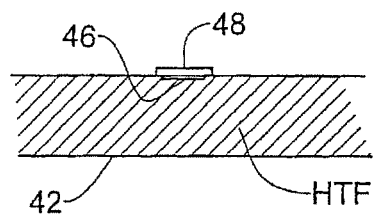
FIG. 4 is a modification of the longitudinal cross-sectional view illustrated in FIG. 3.

Alternatively, as illustrated in FIG. 4, part of the middle portion 42 of the loop may be foamed containing the membrane 46, without provided a chamber as described above. A covering 48 is provided, for example as described above, or wrapped around the portion 42 and covering the membrane.

Figure 5:
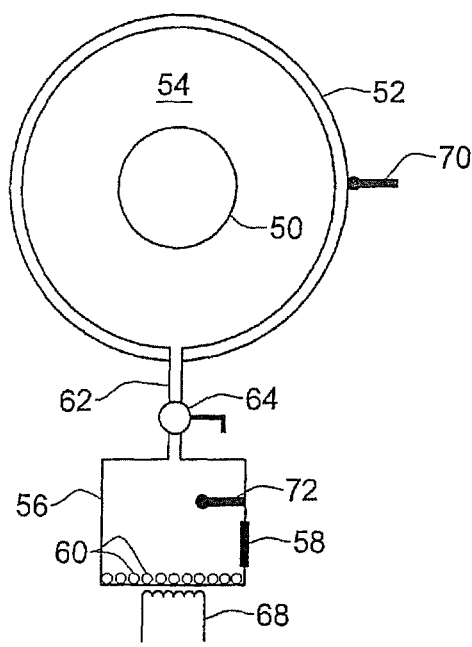
FIG. 5 is a radial cross-sectional view of a header pipe of a solar thermal power plant.

As illustrated in FIG. 5, one or more of the header pipes 34, 36, 38, 40 (in the ensuing discussion and corresponding figures, reference number 50 will be used to refer to header pipe, which may be any header pipe; it will be appreciated that the example described below, while making specific reference to a header pipe, may be provided for any pipe in the plant 10, such as tube radiation absorbers 26, mutatis mutandis) is surrounded by an envelope 52 spaced therefrom, thus defining a volume 54 between the header pipe 50 and the envelope which is evacuated in order to limit heat loss.

A chamber 56 associated with the header pipe 50 is provided, for example in a location which is shielded from incident solar radiation, in order to maintain a low temperature thereof. The chamber 56 may be made of any material, for example of the same material as that of me envelope 52. However, at least one portion of the wall of the chamber 56 is formed as a membrane 58 having a high degree of permeability to hydrogen. It may be made of, e.g., palladium, which may contain silver, for example up to about 20%-30%. In addition, getters 60 (e.g., pellet, or other elements made of a getter material) are provided within the chamber 56.

One or more tubes 62 are provided, which are disposed so as to bring the interior of the chamber 56 into fluid communication with die volume 54 defined between the header pipe 50 and die envelope 52 surrounding it. A valve 64 is provided so as to selectively close the tube 62, thus isolating the interior of the chamber 56 from the volume 54.

Figure 6A:
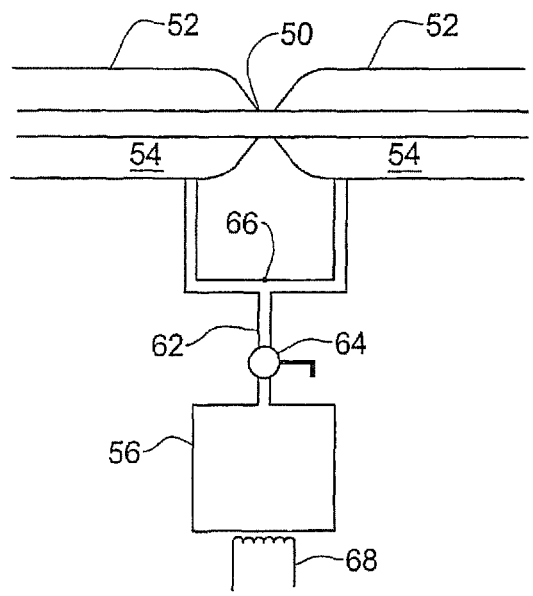
FIGS. 6A and 6B are longitudinal cross-sectional views of a header pipe of a solar thermal power plant.
Figure 6B:
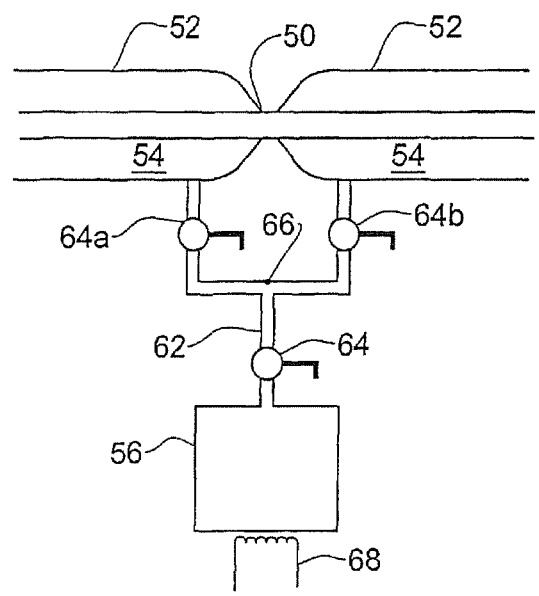

As illustrated in FIG. 6A, one tube 62 may be formed so as to bring two otherwise isolated volumes 54a, 54b into fluid communication with the interior of the chamber 56, for example by providing a T-junction 66 therein. The valve 64 may be placed at a location so as to isolate the two volumes 541a, 54b from the chamber. Alternatively, as illustrated in FIG. 6B, each volume 54a, 54b, may be provided with its own corresponding valve 64a, 64b, so that each may be isolated from the interior of the chamber 56 individually. In addition, the tube 62 may be provided with valves as per both FIGS. 6A and 6B (not illustrated).

In addition, each chamber is associated with a heating element 68, which is configured to heat the getters to a temperature at which hydrogen sequestered therein is released.

A control system (not illustrated) may be further provided in order to regulate operation of elements described above. A temperature sensor 70 may be provided, for example oil the outer surface of the envelope 52, in order to measure the temperature of the volume 54 (placement of the temperature sensor on the exterior surface of the envelope is for convenience; it will be appreciated that the temperature sensor may be placed at any other convenient location). In addition, a pressure sensor 72 may be provided within the chamber 56. The temperature and pressure sensors 70, 72 are in communication with the control system, in order to transmit information thereto regarding conditions within the chamber.

During operation, as heated HTF flows through the header 50, hydrogen is released therethrough into the evacuated volume 54. As discussed above, the source of the hydrogen is either by dissociation therefrom from the HTF, in a case where it is provided as a thermal oil, or from corrosion of the header pipe 50 may be associated with a cathodic reaction in which hydrogen is released. The presence of this hydrogen in the volume 54 allows for conductive heat flow between the header pipe 50 and the atmosphere, thus resulting in heat losses. By absorbing hydrogen, the getters 60 function as a chemical pump, drawing the released hydrogen into the chamber 56 and sequestering it mere, thus helping to maintain the vacuum in the volume.

At a time determined by the control system, for example at night or during an off-peak period of power production, the control system operates in a hydrogen release mode, it closes the valve 64 (thus isolating the interior of the chamber 56 from the volume 54), and turns on the heating element 68 to a temperature above which the getters release the sequestered hydrogen, for example to 400-450° C. The partial pressure of the hydrogen within the chamber 56 rises due to the release of hydrogen from the getters, exceeding that of the atmosphere (which is close to zero). The differential in the partial pressures of hydrogen between the chamber 56 and the atmosphere cause the release of hydrogen to exit the chamber via the membrane 58. At a time determined by the control system, it operates in a hydrogen storage mode, in which it turns off the heating element 68 and opens the valve 64 (thus bringing the ulterior of the chamber 56 into fluid communication with the volume 54). The control system may open the valve 64 only after a delay, during which the getters 60 are allowed to return to a temperature at which they sequester hydrogen.

The determination by the control system as to when to operate in its hydrogen release mode may be based on any one or more of the following:

The temperature within the chamber 56 (for example as measured at the outer surface of the envelope 52) is determined to be a fixed amount (for example, about 25° C.) above the ambient temperature. This may indicate that there is a buildup of hydrogen within the chamber, for example due to the getters inability to sequester hydrogen either due to an elevated temperature thereof, or their having reached their hydrogen storage capacity. The pressure within the chamber 56 may rise above a predetermined pressure. This may indicate that the getters 60 are not storing hydrogen, arid that it must be released therefrom immediately.

A predeteimined amount of time has passed since the last time the controller operated in hydrogen release mode.

In addition, the control system may be configured to only operate in its hydrogen release mode at a certain time of the day, for example at night or at another time when the power demand on plant 10 are relatively low.

In addition, the control system may operate to close the valve 64 if the temperature of the interior of the chamber 56 (for example as measured at the outer surface of the envelope 52) rises above a predetermined value, for example that at which the getters 60 release hydrogen, in order to allow the released hydrogen to exit via the membrane 68.

While the arrangement described above with reference to FIGS. 5 through 6B may be suitable for any pipe carrying HTF within the plant 10, it is particularly suited for a header pipe 50, as it enables them to be insulated by being surrounded by an evacuated space by providing a system for removing the large amounts of hydrogen therefrom, which are released to the relatively large amount of HTF flowing therethrough, without requiring a large amount of getters. In addition, by removing released hydrogen from the HTF flowing through the header pipe 50, the number of getters necessary within the enclosed volumes of the loops may be reduced.

Those skilled in the art to which this invention pertains will readily appreciate that numerous changes, variations and modifications can be made without departing from the scope of the invention mutatis mutandis.

The invention claimed is:

1. A pipe for carrying heat transfer fluid (HTF) within a solar thermal power plant, the pipe comprising:
    a body;
    a chamber disposed radially of the body, the chamber comprising a membrane which has a permeability to hydrogen, wherein the chamber comprises a getter material adapted to absorb hydrogen gas and to release it when the getter material is at or above a discharge temperature;
    a solid envelope surrounding the body and spaced by a volume from the body;
    a valve configured to selectively isolate the chamber from the volume when closed, and bring the chamber and the volume into fluid communication with one another when open; and
    a heating element configured to bring the getter material to a temperature no less than the discharge temperature.

2. The pipe according to claim 1, wherein the membrane comprises palladium.

3. The pipe according to claim 2, wherein the membrane comprises up to approximately 30% silver.

4. The pipe according to claim 1, wherein the pipe comprises stainless steel.

5. The pipe according to claim 1, wherein the envelope comprises a material selected from the group comprising of glass and stainless steel.

* * * * *